US011519508B1

United States Patent
Dooley et al.

(10) Patent No.: US 11,519,508 B1
(45) Date of Patent: Dec. 6, 2022

(54) MIXED REGIME PASSIVE VALVE

(71) Applicant: The United States of America as represented by the Secretary of the Navy, Newport, RI (US)

(72) Inventors: Richard E Dooley, Portsmouth, RI (US); John H Chapman, Groton, CT (US)

(73) Assignee: The United States of America as represented by the Secretary of the Navy

( * ) Notice: Subject to any disclaimer, the term of this patent is extended or adjusted under 35 U.S.C. 154(b) by 97 days.

(21) Appl. No.: 17/313,092

(22) Filed: May 6, 2021

(51) Int. Cl.
| | |
|---|---|
| *F16K 1/22* | (2006.01) |
| *F16K 15/03* | (2006.01) |
| *F16K 1/20* | (2006.01) |
| *F16K 27/02* | (2006.01) |
| *B01D 19/00* | (2006.01) |

(52) U.S. Cl.
CPC ........ *F16K 1/2014* (2013.01); *B01D 19/0063* (2013.01); *F16K 1/222* (2013.01); *F16K 15/034* (2021.08); *F16K 27/0227* (2013.01)

(58) Field of Classification Search
CPC ........ F16K 15/034; F16K 17/12; F16K 1/222; F16K 1/2014; F16K 27/0227; B01D 45/02; B01D 19/0063; C02F 1/20
USPC ................... 137/519, 520, 521, 527.6, 527.8
See application file for complete search history.

(56) References Cited

U.S. PATENT DOCUMENTS

| | | | | | |
|---|---|---|---|---|---|
| 344,138 | A | * | 6/1886 | Schirmeister | ........... F16K 15/03 137/15.01 |
| 1,867,927 | A | * | 7/1932 | Simpson | ................. E03F 5/042 137/527.8 |
| 3,290,001 | A | * | 12/1966 | Taylor | ..................... F16K 1/226 137/329.06 |
| 6,138,988 | A | * | 10/2000 | Bouvet | ................. F02D 9/1015 251/306 |
| 6,848,468 | B1 | * | 2/2005 | Hsien | .................... E03F 5/0405 137/527.8 |
| 8,551,224 | B2 | | 10/2013 | Lazik | |
| 8,894,755 | B2 | | 11/2014 | Bruun | |
| 9,157,307 | B2 | | 10/2015 | Schultz | |
| 9,732,671 | B2 | | 8/2017 | Harper | |

(Continued)

FOREIGN PATENT DOCUMENTS

| | | | | |
|---|---|---|---|---|
| CN | 114270023 A | * | 4/2022 | ............ F01N 1/165 |
| GB | 191102814 A | * | 5/1911 | |

(Continued)

*Primary Examiner* — Marina A Tietjen
(74) *Attorney, Agent, or Firm* — James M. Kasischke; Michael P. Stanley

(57) ABSTRACT

A system for gas extraction is provided with a flap valve coupled to a bore with a pivot axis offset from an axis of the bore. The valve includes a higher mass on a shorter side of the pivot axis. A valve surface on the shorter side is inclined above a horizontal plane when the valve closes. The valve opens during liquid and gas flow to extract gas from the flow. As liquid flows over the valve, the valve is forced to close. The center of gravity of the valve relative to the offset pivot point ensures that the valve remains closed during liquid flow. As gas flows over the valve, closing forces are reduced and under internal vacuum, the mass distribution about the offset pivot axis allows the flap of the valve to tilt; opening the valve and allowing gas to enter the bore.

19 Claims, 9 Drawing Sheets

(56) References Cited

U.S. PATENT DOCUMENTS

| | | |
|---|---|---|
| 9,841,120 B2 | 12/2017 | Nicholson |
| 9,903,106 B2 | 2/2018 | Coscarella |
| 2009/0223365 A1 | 9/2009 | Morkel |
| 2012/0168092 A1 | 7/2012 | Keckler |
| 2016/0121238 A1 | 5/2016 | Mills |
| 2017/0045146 A1* | 2/2017 | Morrison ................ F16K 1/222 |
| 2017/0247242 A1 | 8/2017 | Bonner |

FOREIGN PATENT DOCUMENTS

| | | | | |
|---|---|---|---|---|
| WO | WO-2012079823 A1 * | 6/2012 | ............. | F16K 17/12 |
| WO | WO-2015127268 A1 * | 8/2015 | ............... | F16K 1/18 |

* cited by examiner

MIXED REGIME PASSIVE VALVE

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

1) Field of the Invention

The present invention relates to a passively actuated valve and, more particularly, to a passively actuated flap valve and method of use for the retrieval of gas from a mixed flow of liquid and gas.

2) Description of the Prior Art

A mixed stream of liquid and gas can flow over a surface. The gas and liquid may have different fluid densities thereby, causing the force generated on the surface over which the flow occurs to be different for the gas and the liquid. It is desired to separate the gas from the liquid in the flow and to retrieve the gas through a vertically arranged bore opening up to the surface over which the flow occurs. As the gas is retrieved through the bore, it is also desired that liquid does not enter through the bore.

Previous examples of gas and liquid mitigation and separation include actively controlled devices positioned on the surface over which a mixed flow of liquid and gas occurs. An actively controlled device such as a valve is actuated based on an output of a sensor. The sensor senses the flow of liquid or gas and during the flow of gas and in absence of liquid, the actuator can open the valve to extract the gas from the surface.

Also, centrifugal devices are used to separate gas from liquid during a mixed flow of liquid and gas. However, as recognized herein, the use of sensors, actively controlled devices, and/or centrifugal devices add complexity to the system. Furthermore, such systems may include many working parts which are not suitable for removing gas from external flows.

SUMMARY OF INVENTION

A valve system for gas extraction is provided with a vertically arranged bore having a central axis and a pivotable flap valve coupled to the bore at a pivot axis with the pivot axis offset from the central axis of the bore. The flap valve includes a higher mass on a first, shorter side of the pivot axis. A top surface of the flap valve on the shorter side of the pivot axis is inclined above a horizontal plane when the flap valve is closed. In this way, a valve system is adapted to open during flow of a mixed stream of liquid and gas such that the valve system is effectively used to extract gas from the mixed flow.

More specifically, the valve is a pivotable butterfly valve that opens selectively during an absence of the dynamic force of liquid flow over an external side of the valve. The valve is coupled to the bore at a pivot axis that is axially offset from a central axis of the bore; thereby, dividing the valve into a shorter, first section and a longer, second section along the pivot axis. The mass of the valve is unequally distributed on each side of the pivot axis with the mass being higher on the shorter section. The internal side of the valve facing the bore is subjected to a vacuum.

As liquid flows over the valve in a certain direction, the hydrodynamic forces of the flowing liquid can force the valve to remain in a closed position. The location of the center of gravity of the valve relative to the offset pivot point ensures that the valve remains closed during flow of liquid over the valve even in the presence of the internal vacuum.

As gas flows over the valve, the closing forces are reduced and in the presence of the internal vacuum, the unequal mass distribution about the offset pivot axis allows the flap of the valve to tilt in one direction; thereby, opening the valve and allowing gas to enter the bore. The valve can again close when flow of liquid over the valve resumes.

The particular weight offset described, works as oriented with gravity pointed down. Should the valve be used upside down; the weight offset would have to be changed such that the valve is naturally closed. This weight movement can be eliminated with a light torsion spring over pivot shaft, which could keep the valve flap closed regardless of orientation. Orientation options are important based on internal versus external flow and where the gas tends to collect in a pipe (internal flow) versus on a body (external flow). By using a tactile, self-sensing valve, gas can be selectively separated and extracted from a mixed flow of gas and liquid. Features of the valve such as the offset pivot point and uneven distribution of mass on the valve allow opening and closing of the valve based on presence of dynamic forces on the valve caused only during a liquid flow. The technical effect of using a self-sensing and a passively actuated valve is that complexity of the gas retrieval system involving actively controlled devices, and/or centrifugal devices is reduced. The reduction of complexity results in reducing the cost of the system while maintaining sufficient precision of measurements.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Features of illustrative embodiments may be understood from the accompanying drawings in conjunction with the description. The elements in the drawings may not be drawn to scale. Some elements and/or dimensions may be enlarged or minimized for the purpose of illustration and understanding of the disclosed embodiments wherein.

DETAILED DESCRIPTION OF THE INVENTION

The following description relates to a passively actuated valve system used for the retrieval of gas from a stream of a liquid and gas mixture flowing over the valve system.

Figure 1:
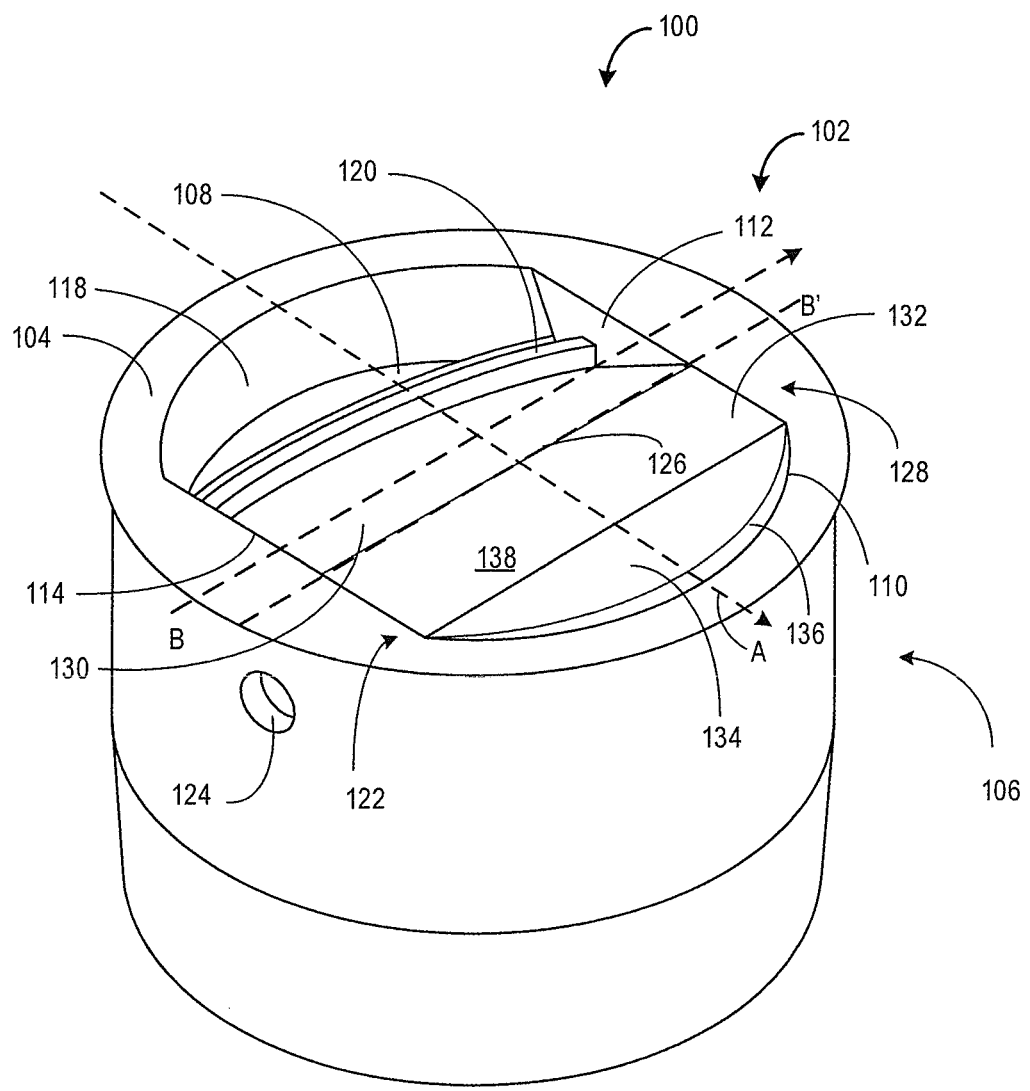
FIG. 1 is a perspective view of a valve system in a closed position in accordance with an embodiment of the present invention.
Figure 2:
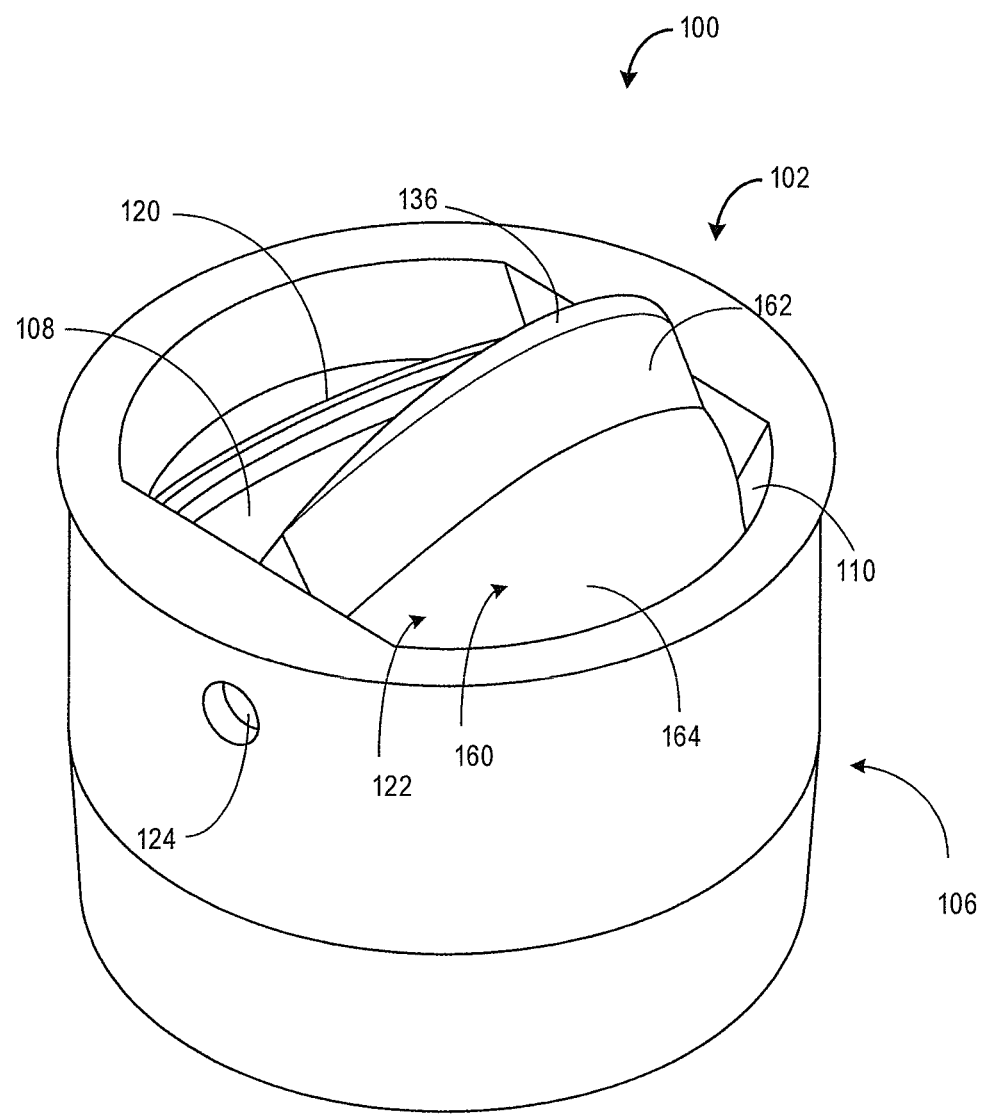
FIG. 2 is a perspective view of the valve system of FIG. 1 in an open position.

In the invention, a valve system 100 is provided in which the system includes a bore, as shown in FIG. 1 and FIG. 2, over which gas is retrieved. During the flow of gas over a valve 102, a flap of the valve is tilted to one side exposing the bore to the gas flow, as shown in the top views of the valve system 100 from a closed position in FIG. 3 to an open position in FIG. 4.

Figure 5:
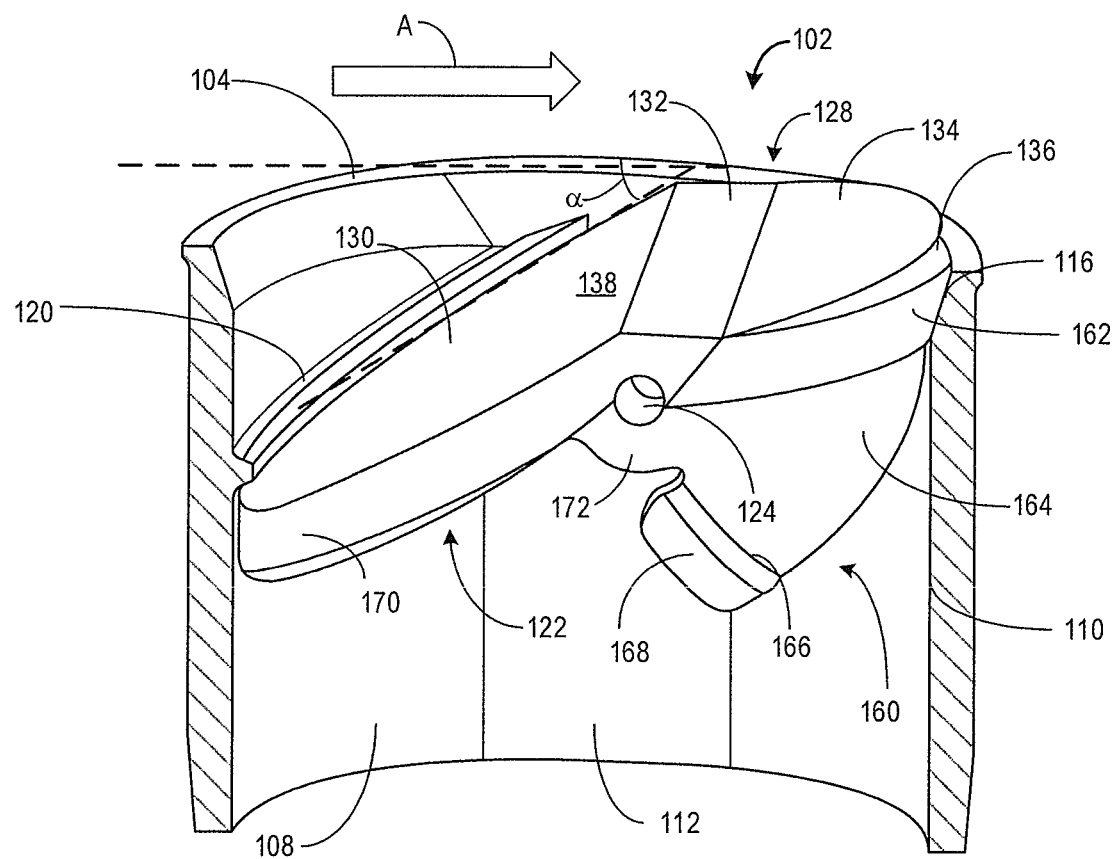
FIG. 5 is a cross-sectional view of the valve system of FIG. 3 in the closed position.
Figure 6:
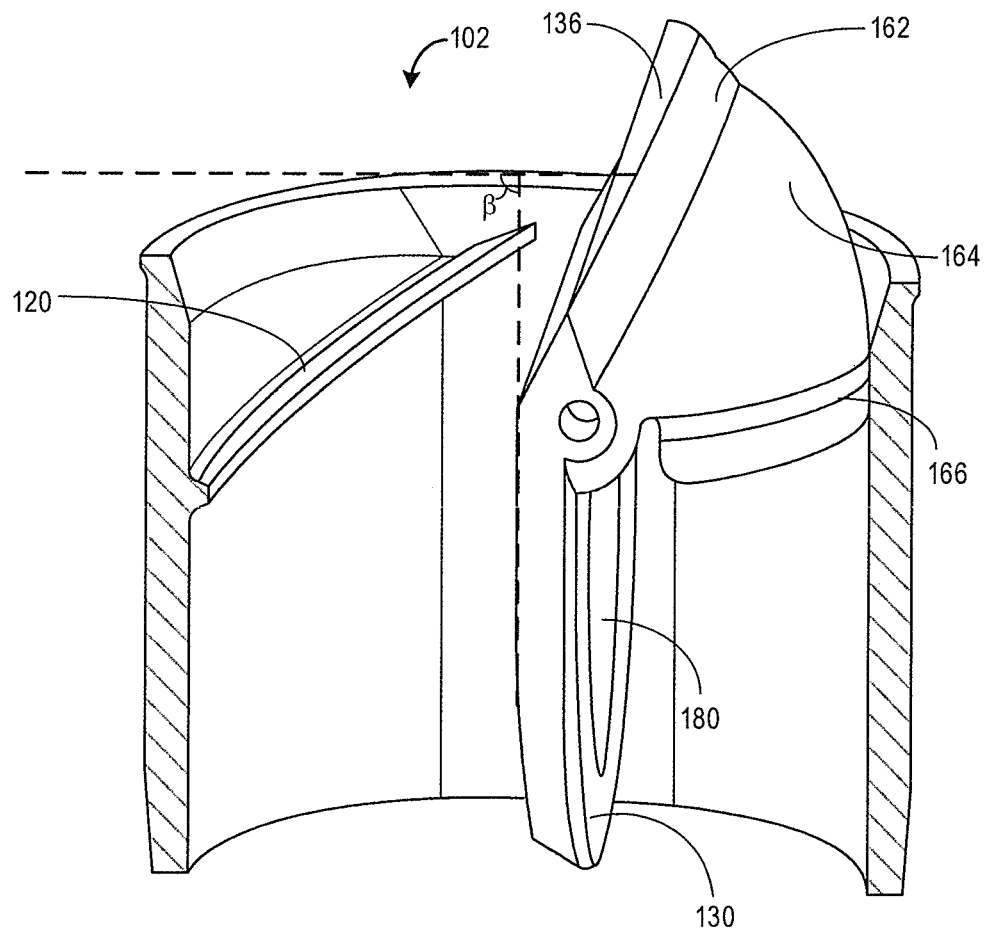
FIG. 6 is a cross-sectional view of the valve system of FIG. 4 in the open position.
Figure 7:
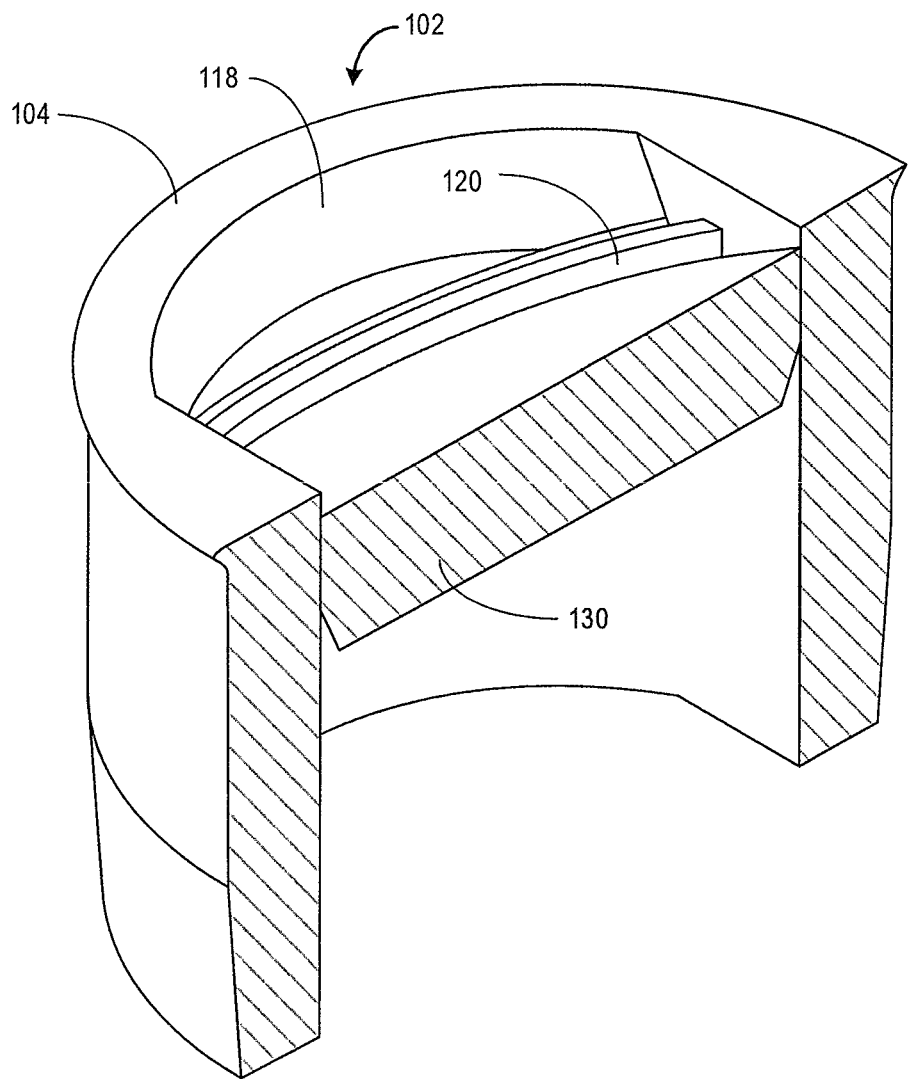
FIG. 7 is another cross-sectional view of the valve system of FIG. 3 in the closed position.
Figure 8:
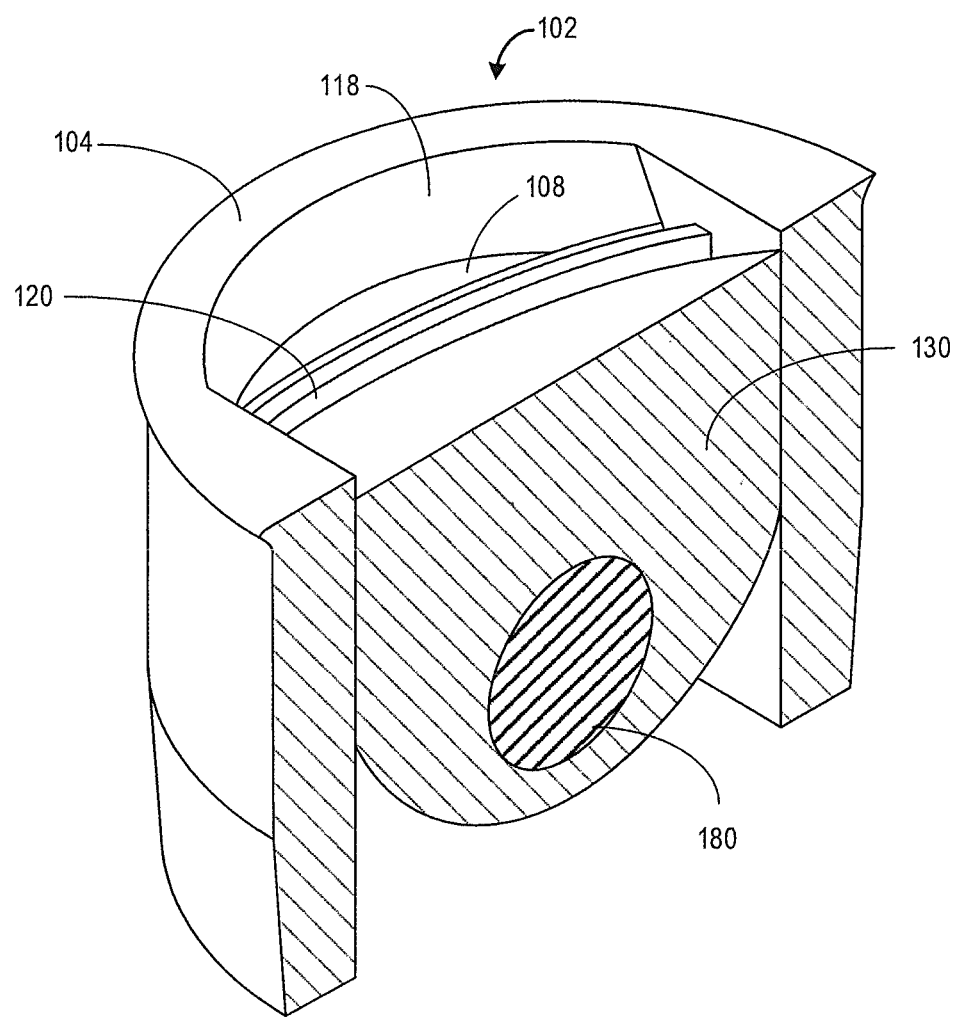
FIG. 8 is a another cross-sectional view of the valve system of FIG. 4 in the open position.
Figure 9:
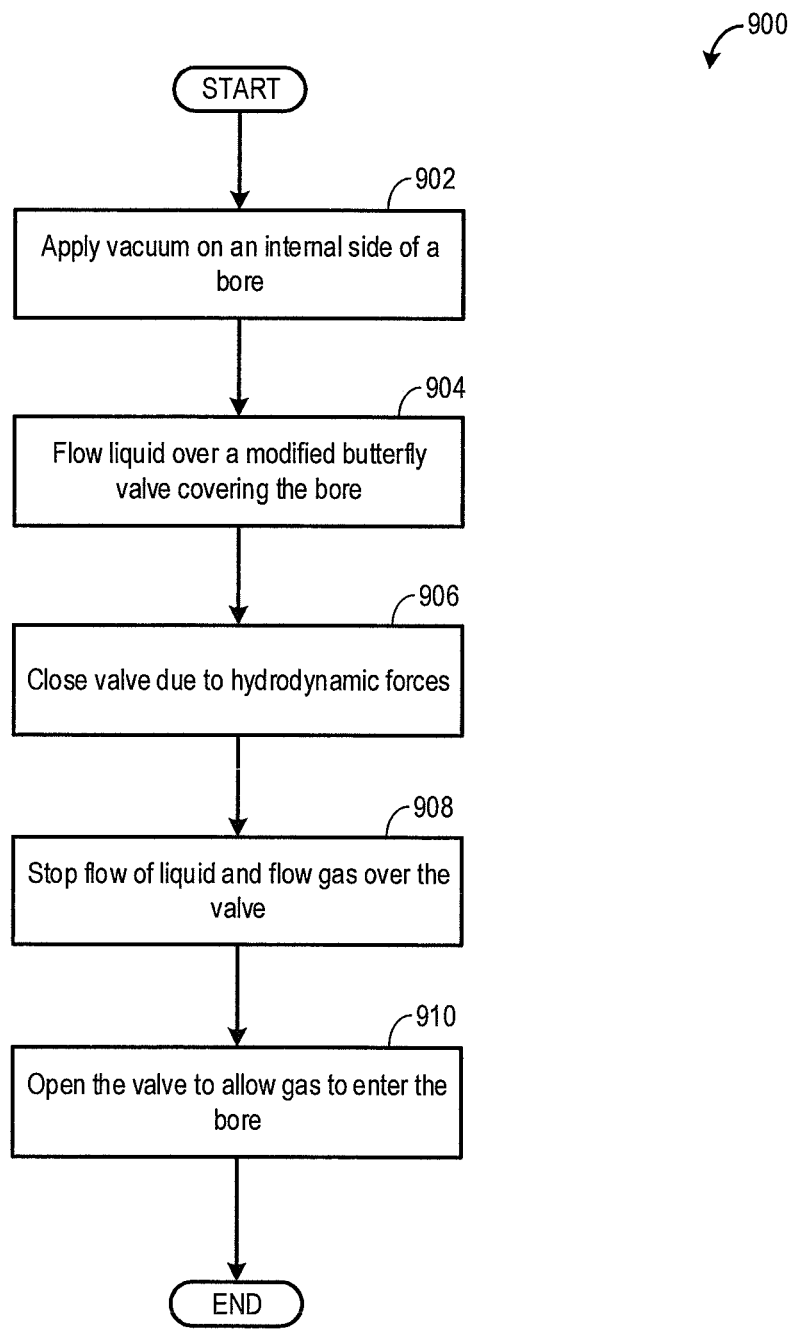
FIG. 9 is a flow-chart illustrating an example method that can be implemented to passively operate the valve system.

The valve 102 includes a pivot axis that is axially off-centered toward one side as shown in a first set of cross sectional views of the valve in FIG. 5 and FIG. 6. A second set of cross-sectional views of the bore including the valve 102 are shown in FIG. 7 and FIG. 8. FIG. 9 shows an example method of passive operation of the valve.

FIG. 1 is a perspective view of a valve 102 in a closed position and FIG. 2 is a perspective view of the valve in an open position. In the figures, the flap valve 102 is positioned over and coupled in alignment with a bore such that a stream of a gas-liquid mixture can flow over the valve in a direction shown by arrow A. The bore can open up to a surface that is exposed to a mixed stream of gas-liquid.

A top rim 104 of a cylindrical bore 106 lining the valve 102 includes a radially symmetric circular circumference. The inner surface (wall) of the bore 106 includes alternating arcuate and flat sections. Two opposing arcuate sections 108 and 110 alternate between two opposing flat sections 112 and 114.

A first ramp 116 (as shown in FIG. 5 and FIG. 6) is positioned between the rim 104 and the arcuate section 110. A second ramp 118 is positioned between the rim 104 and the arcuate section 108. A restraining lip 120 runs along the arcuate section 108 below the second ramp 118. The restraining lip 120 may span more than 180° angle from one pivot point to another along the arcuate section 108.

The valve 102 includes a flap 122 or valve body coupled to the bore 106 at pivot points 124 on opposite sides of the cylindrical bore. The line joining pivot points 124 on opposite sides of the bore 106 forms a pivot axis 126 about which the valve 102 is coupled to the bore. The flap 122 is free to move about the pivot axis 126. As an example, the flap 122 can oscillate in a range of 30-60° about the pivot axis 126.

The pivot axis 126 is axially off-centered relative to a central axis B-B' of the bore 106. The pivot axis 126 is shifted to the right relative to the central axis B-B', such as towards the arcuate section 110 of the bore 106.

The flap 122 can be divided into two segments such as two throttle blades along the pivot axis 126. The two segments include a shorter segment 128 on a first side of the pivot axis 126 between the pivot axis 126 and the arcuate section 110 and a longer segment 130 on a second side of the pivot axis between the pivot axis and the arcuate section 108.

The mass of the flap 122 is distributed unequally on each side of the pivot axis 126. The first side of the flap 122 may be lighter relative to the second side of the flap.

Figure 3:
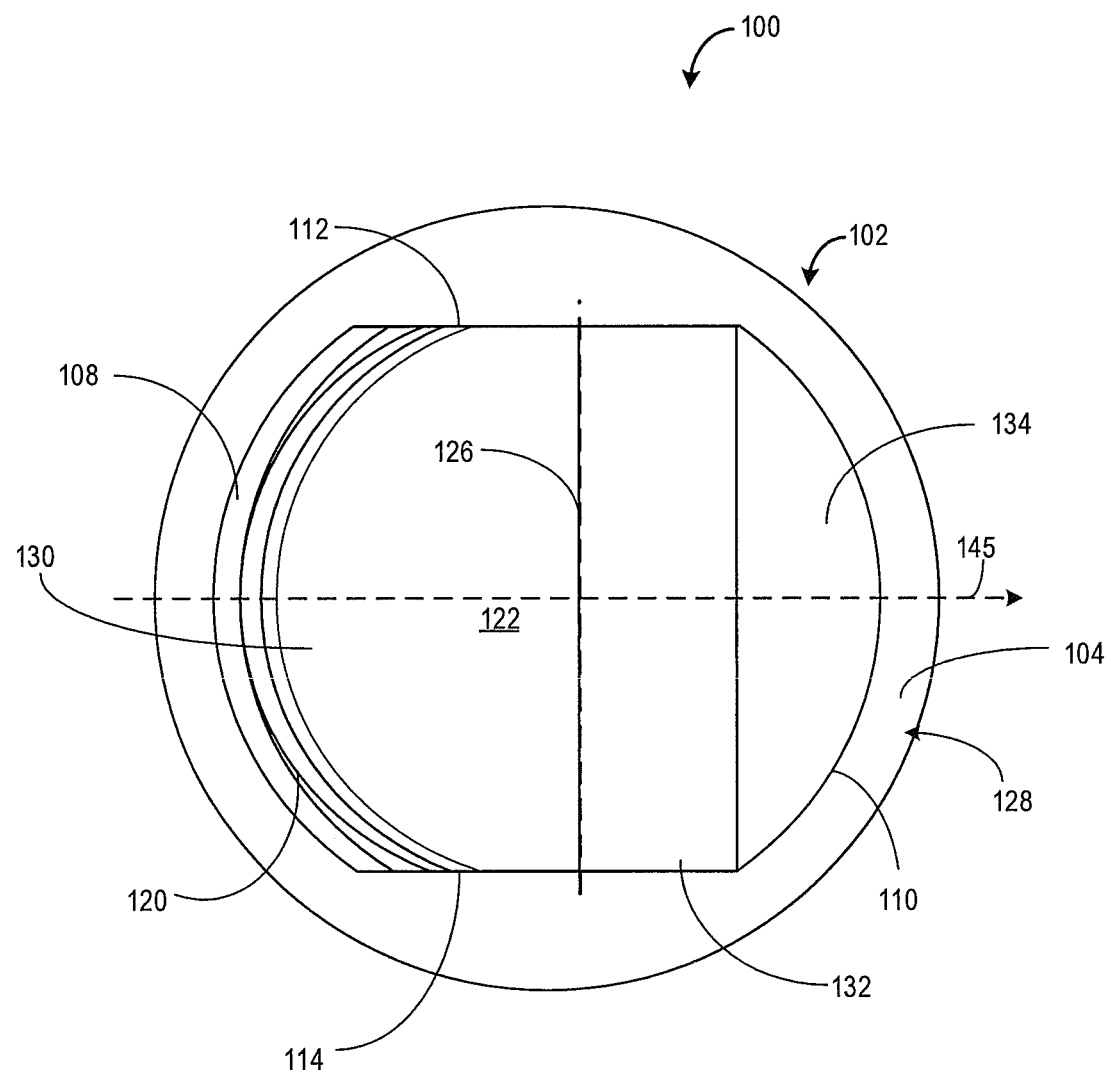
FIG. 3 is a top view of the valve system of FIG. 1 in the closed position.

In the closed position of the valve 102, as seen in FIG. 1 and FIG. 3, the flap 122 covers the entire opening of the bore 106. The longer segment 130 of the flap 122 is angled downward into the bore 106. An arcuate edge of the longer segment 130 rests against the restraining lip 120. In the closed position of the valve 102, the longer segment 130 of the flap 122 is tilted into the bore 106.

As an example shown in FIG. 5, the tilting of the longer segment 130 can form a first angle, $\alpha$, of 10-45° between a plane of the rim 104 of the bore 106 and a top surface of the longer segment of the flap.

The shorter segment 128 may be further divided into a first portion 132 and a second portion 134. The first portion 132 of the first segment 128 is a flat portion with flat sides flush with the first flat section 112 and a second flat section 114, respectively, of the inner surface of the bore 106 on each side. The top surface of the second portion 134 of the first segment 128 is inclined upwards above a horizontal plane of the rim 104 of the bore 106. A peripheral portion 136 of the flap adjoins the top inclines outward above the horizontal plane of the rim 104 of the bore 106.

An upper surface 138 of the flap 122 is in face sharing contact with a gas-liquid flow; the gas-liquid mixture flowing along the direction of the arrow "A" (left to right of the valve 102) from the longer segment 130 towards a first segment of the flap. As an example, when the bore 106 with the valve 102 coupled to it is moving through water from left to right, water can flow over the valve in the direction shown by the arrow A. As further elaborated with relation to FIG. 5, when the water flows over the valve 102, it forces the valve closed, while in absence of the flow of water then the valve can open.

Figure 4:
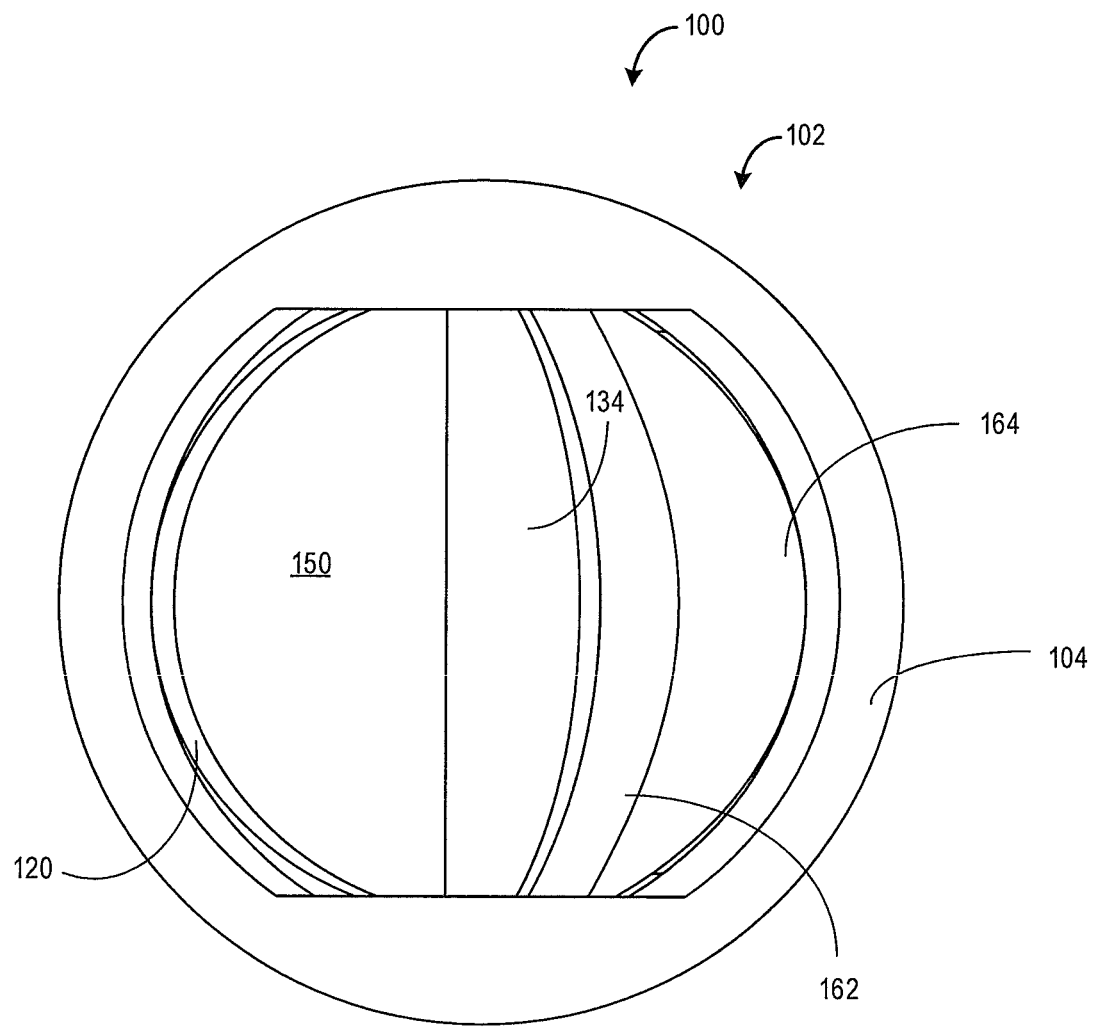
FIG. 4 is a top view of the valve system of FIG. 2 in the open position.

In the open position of the valve 102, as seen in FIG. 2 and FIG. 4, the flap 122 opens partially to allow fluids to enter the bore via an opening 150. The opening 150 spans across a first portion of the bore 106 while the remaining, second, portion of the bore remains covered by flap 122. In the open position, the longer segment 130 of the flap 122 tilts within the bore 106 while the first segment 128 protrudes outward from the horizontal plane of the rim 104 of the bore. The tilting of the flap 122 occurs along the pivot axis 126.

As an example shown in FIG. 6, the tilting of the longer segment 130 can form a second angle, $\beta$, between a horizontal plane of the rim 104 of the bore 106 and a top surface of the longer segment 130 of the flap 122. In the example, $\beta$, is a right angle of 90°.

A lower surface 160 of the flap 122 includes an angular section 162 joining the peripheral portion 136 to a hemispherical section 164. In the open position, the angular section 162 and hemispherical section 164 protrude outward from the horizontal plane of the rim 104 of the bore 106.

FIG. 5 shows a first cross-sectional view and FIG. 7 shows a third cross-sectional view of the valve 102 in the open position. FIG. 6 shows a second cross-sectional view and FIG. 8 shows a fourth cross-sectional view of the valve 102 in the closed position.

The first and second cross-sectional views of FIG. 5 and FIG. 6 are taken along the arcuate sections 108 and 110 such as along the direction arrow A. The third and fourth cross-sectional views of FIG. 7 and FIG. 8 are taken along the flat section 112 and the flat section 114 such as along the pivot axis 126. Therefore, the first cross-sectional views of FIG. 5 and FIG. 6 shows a plane perpendicular to that of the cross-sectional views of FIG. 7 and FIG. 8.

The cross-sectional views provide further details of the lower surface 160 of the flap 122 of the valve 102. The longer segment 130 of the flap 122 is elliptical shaped with a rounded wall 170 (angled towards the upper surface 138) joining the upper surface and the lower surface. The hemispherical section 164 ends in a cylindrical portion 166 with a flat lower surface 168. The lower surface of the longer segment 130 of the flap 122 is joined to the cylindrical portion 166 via an arcuate section 172 framing the pivot point 124.

In the closed position, the angular section 162 joining the peripheral portion 136 to the hemispherical section 164 is in face sharing contact with a second ramp 118 between the rim 104 and the arcuate section 110. In the open position, the cylindrical portion 166 is in face sharing contact with the arcuate section 110. Due to the large surface area of contact between the cylindrical portion 166 and the arcuate section 110, the valve 102 does not get stuck in the open position. Also, during opening of the valve 102, as the cylindrical portion 166 hits the arcuate section 110 of the bore, the flap 122 is stopped from rotating about the pivot axis 126.

The uneven distribution of mass about the pivot axis 126 is caused by the presence of the heavier hemispherical section 164 on the arcuate section 108 of the flap 122. The lower surface of the elliptical shaped longer segment 130 of the flap 122 includes a round cutout 180 to further lower the mass on the longer segment and adjust the mass on both sides of the pivot axis 126.

During a first operating condition, the valve is passively opened by rotating the flap 122 about the off-centered pivot axis 126 in a first direction in a presence of internal vacuum to allow flow of gases into the cylindrical bore 106, and during a second operating condition, the valve is passively opened by rotating the flap about the off-centered pivot axis in a second, opposite, direction in presence or absence of internal vacuum to block liquids from entering the bore. The first condition includes a flow of only gases over a surface contacting the valve 102 in the presence of the internal vacuum, and the second condition includes a flow of liquids over the surface by applying dynamic force on the valve.

In an open position of the valve 102, if a liquid flow resumes, the valve can close upon the liquid hitting the protruded face of the arcuate section 108 of the shorter segment 128 and the hydrodynamic forces can maintain the valve in the closed position. Furthermore, in the open position, backwards flow of liquid (such as in a direction opposite to the direction shown by the arrow A) is stopped from entering the bore by the protruding hemispherical section 164. In the closed position of the valve, backwards flow of liquid (such as in a direction opposite to the direction shown by arrow A) is stopped by the inclined arcuate shorter segment 128. The peripheral portion 136 of the flap 122 protruding out of horizontal plane of the rim 104 of the bore 106 averts undesired backflow of liquid into the bore.

As one example, if a bubble comes in contact with the valve 102, the bubble can expand and collapse over the valve. The liquid in the bubble can be averted from entering the bore while the gas can be sucked in.

FIG. 9 shows an example method 500 for operating a self-sensing, passive, modified butterfly or flap valve (such as the valve 102) coupled to a bore (such as the bore 106). The valve covers the entire opening of the bore. The bore opens to a surface on which a mixed stream of liquid and gas flows in one direction.

At step 502, vacuum (a lower than atmospheric pressure) is applied on an internal side of the bore to facilitate actuation of the valve and suction of gas into the bore. At step 504, a liquid (such as water) flows over the flap valve covering the bore. As the liquid flows over, a dynamic force is generated on a top surface of the valve.

At step 506, the hydrodynamic force generated due to the flow of liquid causes the valve to close even in the presence of internal vacuum. Closing of the valve includes a flap or valve body (such as flap 122) of the valve to rotate clockwise about the pivot axis (such as axis 126) and flatten over the opening of the bore.

At the closed position, the flap is not planer with the horizontal plane of the rim of the bore as a second segment of the flap (such as the longer segment 130) on a second side of the pivot axis is tilted into the bore and a top surface of a first segment of the flap (such as the shorter segment 128) is inclined above the horizontal plane of the rim. The second segment of the flap rests on a restraining lip (such as the restraining lip 120) along an arcuate inner surface of the bore. The valve can also remain closed in the absence of the internal vacuum (lower pressure).

At step 508, flow of liquid over the valve is stopped and only gas (such as air) flows over the valve. In the absence of the hydrodynamic force over the valve; at step 510, the valve is opened due to the internal vacuum and the unequal mass distribution about the offset pivot axis. The heavier mass on the shorter side of the flap causes the flap of the valve to rotate counter-clockwise about its pivot axis, thereby opening the valve.

Opening the valve includes a exposing a portion of an opening of the bore to the gas flow. At the open position, the opening of the bore is partially exposed to the gas flow while a portion of the opening is covered. The internal vacuum in the bore, sucks in the gas flowing over the valve, thereby extracting gas from the mixed liquid-gas flow. Again, if liquid flow resumes over the valve, the dynamic forces of liquid will cause the valve to close, thereby restricting liquid from entering the bore.

In this way, a passively actuated valve coupled at an opening of a passage can be used to effectively extract gases from a mixed stream of liquid and gas flowing over s surface. The valve can be closed by exerting hydrodynamic forces generated by a flow of the liquid over a flap of the valve, and the valve can be subsequently opened by suspending the flow of the liquid over the flap and applying vacuum within the passage. A gas flowing over the valve is routed into the passage via the open valve.

The particular weight offset described works as oriented with gravity pointed down and as shown in the figures supporting the present invention. In a variant of the embodiment and should the valve be used upside down; the weight offset would have to be changed such that the valve is naturally closed. This weight movement can be eliminated with a light torsion spring over the pivot shaft, which could keep the valve flap closed regardless of orientation.

The invention has been described with references to specific embodiments. While particular values, relationships, materials, and steps have been set forth for purposes of describing concepts of the present disclosure, it will be appreciated by persons skilled in the art that numerous variations and/or modifications may be made to the invention as shown in the disclosed embodiments without departing from the spirit or scope of the basic concepts and operating principles of the invention as broadly described.

What is claimed is:

1. A valve system for gas extraction, said valve system comprising: a vertically arranged bore having a central axis; and
a pivotable flap valve coupled to said bore with said flap valve having a pivot axis axially offset from the central axis of said bore, said flap valve having a higher mass on a first, shorter side of the pivot axis with a top surface of said flap valve on the shorter side of the pivot axis inclined above a horizontal plane when said flap valve is closed;
wherein said flap valve is closed covering said bore during flow of a liquid over said valve system, and wherein said flap valve is open partly exposing said bore during flow of only gas over the valve system thereby allowing gas to enter the bore.

2. The system of claim 1, wherein the horizontal plane is along a rim of said bore with said system further comprising a peripheral portion of said flap valve adjoining the top surface of said flap valve protruding outward from the horizontal plane when said flap valve is closed.

3. The system of claim 2, wherein the rim of said bore is radially symmetric and wherein an inner surface of said bore includes a first arcuate section and a second arcuate section alternating with a first flat section and a second flat section.

4. The system of claim 3, wherein the coupling of said flap valve at the pivot axis includes attaching said flap valve to each of a first pivot point on the first flat section and a second pivot point on the second flat section, the pivot axis connecting the first pivot point and the second pivot point.

5. The system of claim 4, further comprising a restraining lip along the second arcuate section of the inner surface of said bore extending from the first flat section to the second flat section.

6. The system of claim 5, wherein said flap valve is subdivided into a second, longer side between the pivot axis and the second arcuate section, and the first, shorter side between the pivot axis and the second arcuate section, the central axis passing through the second, longer side.

7. The system of claim 6, wherein the first, shorter side includes a hemispherical lower surface, the hemispherical lower surface leading to a cylindrical section.

8. The system of claim 7, wherein when said flap valve is closed, an edge of the second side of said flap valve rests on said restraining lip forming a first angle between the horizontal plane of the rim and an upper surface of the second side of said flap valve.

9. The system of claim 8, wherein when said flap valve is open, the second side of said flap valve tilts within said bore forming a right angle between the horizontal plane of the rim and the upper surface of the first side of said flap valve protrudes out of the horizontal plane.

10. The system of claim 1, wherein said flap valve dynamically opens by rotating about the pivot axis in a first direction in an absence of hydrodynamic forces and a presence of an internal vacuum, and wherein said flap valve dynamically closes by rotating in a second direction about the pivot axis due to the hydrodynamic forces exerted by the liquid flowing over said valve system regardless of the presence of the internal vacuum, the second direction being opposite to the first direction.

11. A method for operating a passively actuated valve coupled at an opening of a passage, said method comprising the steps of:
closing the valve by exerting hydrodynamic forces generated by a flow of a liquid over a flap of the valve;
opening the valve by suspending the flow of the liquid over the flap and applying vacuum within the passage; and
routing a gas flowing over the valve into the passage via the opened valve, the flap coupled to the opening along a pivot axis offset relative to a central axis of the opening.

12. The method of claim 11, wherein the flap includes a first, heavier segment on a first side of the pivot axis and a second, lighter segment on a second side of the pivot axis.

13. The method of claim 12, wherein the flap rotates counter-clockwise in a range of 30-60° about the pivot axis for opening the valve and wherein the flap rotates clockwise about the pivot axis for closing the valve.

14. The method of claim 13, wherein upon closing of the valve, a top surface of the first, heavier segment is tilted upwards out of a horizontal plane of a rim of the passage and a top surface of the second, lighter segment is angled inward within the passage forming a first angle between the horizontal plane of the rim and the top surface of the second, lighter segment.

15. The method of claim 14, wherein upon opening of the valve, is angled inward within the passage forming a second angle between the horizontal plane of the rim and the top surface of the second, lighter segment, and the first, heavier segment is protruded outward from the horizontal plane, the second angle larger than the first angle.

16. A method for a flap valve regulating flow of fluid into a bore, said method comprising the steps of:
during a first condition, opening the valve passively by rotating the flap valve about an off-centered pivot axis in a first direction in a presence of internal vacuum to allow flow of gases into the bore; and
during a second condition, closing the valve passively by rotating the flap valve about the off-centered pivot axis in a second, opposite, direction in the presence or absence of internal vacuum to block liquids from entering the bore, the flap valve includes unequal mass distribution about the off-centered pivot axis.

17. The method of claim 16, wherein the first condition includes a flow of only gases over a surface contacting the flap valve in the presence of the internal vacuum, and wherein the second condition includes a flow of liquids over the surface applying dynamic force on the valve.

18. The method of claim 17, wherein the off-centered pivot axis is shifted towards one side of a central axis of the bore, the flap valve rotatable in a range of 30-60° about the pivot axis.

19. The method of claim 18, wherein the unequal mass distribution includes a heavier, first segment of the flap valve on a first side of the pivot axis including a hemispherical lower surface, and a lighter, second segment of the flap valve on a second side of the pivot axis including a cutout on a lower surface.

* * * * *